United States Patent [19]

Kivits et al.

[11] Patent Number: 4,675,227

[45] Date of Patent: Jun. 23, 1987

[54] INFORMATION RECORDING ELEMENT

[75] Inventors: Petrus J. Kivits; Marinus R. J. De Bont, both of Eindhoven, Netherlands

[73] Assignee: U.S. Philips Corporation, New York, N.Y.

[21] Appl. No.: 464,545

[22] Filed: Feb. 7, 1983

Related U.S. Application Data

[63] Continuation of Ser. No. 227,038, Jan. 21, 1981, abandoned, which is a continuation of Ser. No. 39,723, May 17, 1979, abandoned.

[30] Foreign Application Priority Data

May 24, 1978 [NL] Netherlands ............................ 7805605

[51] Int. Cl.[4] ........................ B32B 3/14; B32B 15/08; G01D 9/00
[52] U.S. Cl. .................................. 428/195; 346/76 L; 346/135.1; 427/44; 427/54.1; 427/261; 427/266; 428/209; 428/913; 430/945
[58] Field of Search ............... 428/500, 195, 209, 913; 427/44, 54.1, 261, 265, 266; 430/945, 935, 17, 524; 204/159.14; 346/76 L, 135.1; 358/128.5

[56] References Cited

U.S. PATENT DOCUMENTS

| | | | |
|---|---|---|---|
| 3,438,050 | 4/1969 | Aschenbrenner et al. | 346/76 L |
| 3,697,395 | 10/1972 | Kehr et al. | 204/159.14 |
| 3,697,396 | 10/1972 | Kehr et al. | 204/159.14 |
| 3,697,397 | 10/1972 | Kehr et al. | 204/159.4 |
| 3,740,761 | 6/1973 | Fechter | 346/135.1 |
| 3,911,444 | 10/1975 | Lou et al. | 346/135.1 |
| 4,000,492 | 12/1976 | Willens | 346/135.1 |
| 4,008,341 | 2/1977 | Kehr | 427/44 |
| 4,101,907 | 7/1978 | Bell et al. | 345/135.1 |

FOREIGN PATENT DOCUMENTS

| | | | |
|---|---|---|---|
| 2266933 | 10/1975 | France | 428/913 |
| 1442087 | 7/1976 | United Kingdom | 346/76 L |
| 2005155 | 4/1979 | United Kingdom | 428/913 |

Primary Examiner—Thomas J. Herbert
Attorney, Agent, or Firm—Norman N. Spain

[57] ABSTRACT

An information recording element which information is recordable by means of light, in particular laser light. The recording element comprises a substrate provided on one side with a radiation-cured layer, in particular a U.V. light-cured layer of a radiation-curable solvent-free liquid composition having at least one ethene group per molecule. Each radiation-cured layer is provided with a servo track on its surface remote from the substrate and an ablative information recording layer capable, by exposure to laser-type radiation, of forming an optically readable information track, situated on the surface of the radiation-cured layer in contact with the servo track.

9 Claims, 4 Drawing Figures

INFORMATION RECORDING ELEMENT

This application is a continuation of application Ser. No. 227,038 filed Jan. 21, 1981 and now abandoned. Said application Ser. No. 227,038 in turn being a continuation of application Ser. No. 039,723 filed May 17, 1979 and now abandoned.

The invention relates to an information recording element in which information can be written and read optically, which element comprises a substrate plate which is provided on one side with a screening layer of synthetic resin which in turn is provided with an information recording layer.

Such a recording element is disclosed in French Patent Application No. 7510447 in which a layer of a synthetic resin provided between a polyester substrate and a recording layer of bismuth or bismuth and selenium is used as a screening layer. According to the said French Patent Application the use of a screening layer of a synthetic resin presents the advantage that impurities of the substrate do not influence the recording layer. Furthermore it is achieved that upon recording information whereby by means of laser light holes are formed in the recording layer, less laser energy is required.

In Applicants' opinion this latter aspect is the result of the poor thermal conductivity of the synthetic resin screening layer which causes less laser energy in the form of thermal energy to flow away to the substrate.

According to the said French Patent Application the holes formed in the recording layer have a diameter of 6 $\mu$m.

One object of the present invention is to provide an improved recording element of the aforesaid kind in which the holes formed in the recording layer may have a diameter of approximately 0.5 to 1 $\mu$m. The information density thus obtained is very high.

Another object of the invention is to provide a recording element in which information can be written very rapidly at a speed of $10^6$ to $10^8$ information bits (holes in the recording layer) per second. Furthermore the laser light energy for recording is low whereby a laser with a miximum power of 25 mW and preferably 5–10 mW on the recording layer can be used.

With these ends in view it has been found that the application of a synthetic resin screening layer which according to the French Patent Application is provided as a solution in, for example, methyl ethyl ketone, does not give optimum results.

For example, the solvent used must be evaporated and then be recovered by condensation. Apart from the fact that a vapour deposition and condensation process is expensive and time-consuming, in which the required safety and protection measures have to be taken, the instant at which the layer of synthetic resin to be formed solidifies is not clearly defined. This implies that the substrate plate must be positioned exactly during a longer period of time so as to avoid differences in thickness in the layer of synthetic resin to be formed. It is also impossible in practice to remove all the solvent so that the recording layer may be influenced by the remainder of solvent. It is to be noted that the chemical attack of the recording layer by the substrate depends strongly on the type of substrate and recording layer.

When a polyester substrate and a bismuth recording layer are employed as in the French Patent Application, the chemical attack is considerable in which bismuth is converted partly and gradually into transparent bismuth oxide. In the case of other substrates and recording layers the chemical attack is much smaller or even not present so that in that case the introduction of a solvent-containing screening layer of plastics synthetic resin might mean that the remedy is worse than the disease.

The invention provides an information recording element of the aforesaid kind which meets the above given objects, mitigates the above mentioned drawbacks and shows an excellent quality of the recorded information. According to the present invention there is provided an information recording element in which information can be written and read optically, which element comprises a substrate plate which is provided on one side with a screening layer of synthetic resin which in turn is provided with an information recording layer, characterized in that the screening layer is a radiation-cured layer of a radiation curable liquid composition.

The cured layer is obtained by providing the substrate plate with a layer of the liquid radiation curable composition and then curing the composition by radiation, for example by exposure to ultraviolet light.

The radiation-curable composition does not contain a solvent, has a low viscosity and provides a good flow without air bubble inclusions on the substrate surface. The curing time is low and varies roughly from a few seconds to a few minutes. The curing may be carried out at ambient temperature. The cured layer shows a good adhesion to the substrate plate, has an excellently defined surface and furthermore, due to the crosslink structure, is not or is only slightly sensitive to temperature and humidity.

In one embodiment a suitable radiation-curable liquid composition comprises a radiation-linkable ethenic unsaturated compound containing at least an ethene group (—CH=CH) per molecule. The composition also comprises a radiation-sensitive initiator. As an example of an initiator may be mentioned a UV light-sensitive initiator, for example a benzoin, for example, benzoin-isobutyl ether, which is present in the curable composition in a quantity by weight of 0.5–3%.

Readily useful liquid compositions are notably liquid mixtures of monomers and/or oligomers on the basis of mono, di, tri, and tetra esters of acrylic acid which may be applied as a thin liquid layer.

This applies in particular to liquid mixtures containing from 40–90% by weight of a monoacrylate, 5–50% by weight of a di, tri and/or tetra acrylate, as well as 0.5–3% by weight of an initiator.

The average molecular weight of the acrylic acid esters processed in the composition is comparatively small and is preferably at most 500.

Examples of suitable readily useful acrylic acid esters are monoacrylates, for example alkyl acrylates, alkoxyalkyl acrylates, phenoxylalkyl acrylates and phenyl acrylate, for example, ethyl acrylate, n-butyl acrylate, hexyl acrylate, octyl acrylate, 2-ethyl hexyl acrylate, octadecyl acrylate, ethoxyethyl acrylate and phenoxyethyl acrylate; diacrylates, for example alkanediol diacrylates and alkeneglycol diacrylates, for example, 1,3-propanediol diacrylate, diethyleneglycol diacrylate and tetraethylene-glycol diacrylate; triacrylates, for example trimethylol propane triacrylate and pentaerytritol triacrylate; tetracrylates, for example, pentaerytritol tetra-acrylate; as well as oligomeric acrylic acid esters, for example, polyethyleneglycol acrylate and epoxy acrylate.

Likewise readily useful liquid compositions are those containing a mixture of a radiation cross-linkable polyene groups (—CH=CH—) and a polythiol compound containing per molecule two or more thiol groups (—SH).

Suitable polythiol compounds and polyene compounds are known from literature and are commercially available. Reference may be made, for example, to the U.S. Pat. Nos. 3,697,395, 3,697,396, 3,697,397 and 4,008,341.

Good results are obtained in particular with comparatively low-viscous liquid mixtures of polythiols and polyenes the viscosity of which, by way of example is lower than 100 cP and preferably is lower than 20 cP. Mixtures of polythiols and polyenes corresponding hereto comprises generally low-molecular compounds in which the polythiol compound preferably has a maximum molecular weight of 1000 and the polyene compound has a maximum molecular weight of 500.

Very suitable liquid compositions contain a mixture of a di, tri or tetrathiol compound and a diene, triene or tetraene compound.

This applies in particular to a mixture of a diene compound and a trithiol or tetrathiol compound in an equivalent ratio of 2:1 to 1:2, as well as to a mixture of a triene compound and a dithiol or trithiol compound likewise in an equivalent ratio of 2:1 to 1:2.

The term equivalent ratio is to be understood to mean the ratio between gram equivalents of the "ene compound" (—CH=CH—group) and gram equivalents of the thiol compound (—SH—group).

It has been found that with an equivalent ratio "enethiol" which is higher than 2:1 or lower than 1:2 the exposure times for the curing of the liquid compositions become rather long and sometimes are more than 30 minutes.

Short exposure times of at most 5 minutes can be used in particular with equivalent ratios "enethiol" of approximately 1:1.

A very interesting radiation-curable composition contains a mixture of a trithiol compound and a triene compound. Very short exposure times of a few minutes are also sufficient with equivalent ratios "ene-thiol" of 2:1 or 1:2.

Examples of useful polythiol compounds are esters of thioglycol acid, 2-mercaptopropionic acid or 3-mercaptopropionic acid and polyhydroxy compounds. Specific suitable polythiol compounds are inter alia pentaerytritoltetrathioglycolate, pentaerytritoltetra (3-mercaptopropionate), trimethylolpropanetri (3-mercaptopropionate), trimethylolpropanetrithioglycolate, ethyleneglycoldimercaptopropionate, ethylene-glycoldimercapto acetate and ethyleneglycoldithio glycolate.

Examples of suitable polyene compounds are esters of polyhydroxy compounds and polybasic acrylic acids and in particular allyl esters or allyl ethers of respectively, polybasic acids or polyhydroxy compounds. Speicifc representatives of suitable polyenes are alkanediol diacrylates, for example, 1,3-butanediol diacrylate and 1,3-hexanediol diacrylate, furthermore tetrathyleneglycol diacrylate, tripropyleneglycol diacrylate, trimethylolpropane triacrylate, diallyl oxalate, diallyl diglycol carbonate, diallylmaleinate, diallyl diglycolate, diallyl malonate, triallyl trimellitate and triallyl isocyanurate.

As noted before, the radiation-curable composition contains, in addition to the already mentioned cross-linkable compounds, also a light sensitive initiator or activator which initiates the desired radical formation and subsequent polymerisation. A suitable initiator is a proton abstraction agent such as a phenon-, quinone-, xanthenone-, anthracenone- or naphtone compound, for example, benzophenone or benzoinisobutyl ether. The quantity of initiator is approximately 0.5-3% by weight. The compositions may also contain the usual additives, for example an antioxidant, for example, the 2,6-ditert, butyl-4-methyl-phenol known commercially as Ionol in a quantity of 0.05-0.5% by weight, as well as a stabiliser, for example, a 30% aquous solution of phosphorous acid in a quantity of 0.05-0.5% by weight of phosphorous acid.

As regards specific compositions, reference may be made to the Netherlands Patent Application No. 7,611,395 (PHN 8576) and 7,804,036 (PHN 9103) in the name of Applicants which are deemed to be incorporated in the present specification by reference.

The information recording layer is a so called ablative layer that is a layer which upon irradiation with laser light modulated in accordance with the information to be registrated, melts on the irradiation spots followed by edgelike retraction of the molten material under the influence of surface active forces, thereby forming a hole with upstanding adge in the recording layer. Ablative recording layers are known as such and for example described in the Dutch Patent Application No. 7607997 published on Jan. 20, 1977.

A suitable recording layer or use in the element according to the invention is a thin layer of about 10–100 nm comprising one or more of the elements chosen from the group consisting of Bi, Te, Se, Sn, As Sb, Ge, Ga, In, Tl, S and Si. Particularly suitable are recording layers comprising Bi, Te or a chalcogenide glass. The recording layer can easily be provided upon the radiation cured layer by means of a vapour deposition process.

Information is recorded in the element of the invention by focussing a laser light beam which is modulated in accordance with the information and has a pulstime of $10^{-6}$ till $10^{-8}$ sec. upon the recording layer. The beam is derived from a laser such as an AlGaAs (aluminium, gallium, arsenic) laser with an emission wave length of 850 nm having a maximum power of 25 mW upon the recording layer and generally has a power of 5–10 mW. As a result of the pulsated irradiation holes with a diameter of about 0.5-1 μm formed in the recording laser. The low pulstime and low diameter of the holes enable a very rapid registration of information with a high density of information storage.

The holes produced in the recording layer can be read optically. The reading beam is also a laser light beam, which of course, is significantly less energy-rich than the writing laser light beam. So the laser used in reading has less power.

Both reading and writing information are preferably carried out by radiating the recording layer via the substrate. In this case the substrate and the radiation cured layer should be transparent to the laser light used. The substrate consists preferably of a transparent synthetic resin, for example, polymethyl methacrylate, polysulfone, polycarbonate, polyvinyl chloride and copolymers of vinyl chloride and vinyl acetate. Glass is also a very suitable substrate material, due to its infinitely low water permeability. The radiation cured layers as described hereinbefore are transparent to laser light. The advantage of the exposure via the substrate is that scratches or dust particles present on the surface of the substrate fall outside the depth of focus of the objective which focuses the laser light on the recording layer. The reading of recorded information is furthermore carried out preferably in reflection. Herewith it is achieved that the scanning and reflecting reading light beam follow for the greater part the same optical path so that fewer optical elements, such as objectives, are necessary as compared with reading in transmission. The materials of the recording layer as given hereabove show a sufficient reflectence to realize a satisfactory read-out in reflection.

When writing and reading via the substrate, the laser light beam transverses the interface between substrate and cured lacquer layer. This interface lies within the depth of focus of the objective but cannot be observed optically in that the radiation cured layer used in the recording element, adheres completely to and has the same or substantially the same refractive index as the substrate material so that no birefringence occur. This latter aspect is of essential importance for reading in reflection in which polarized laser light is used.

The above given cured layers have a refractive index of approximately 1.5 which correspond to that of the above-mentioned transparent substrate materials.

The adhesion of the radiation-cured layer to the substrate surface depends on the type of lacquer and substrate. Both should be matched to each other.

It holds that aprotic layers give a good adhesion to synthetic resin substrates. Layers composed on the basis of the above-described specific radiation curable compounds are aprotic after curing. It is to be noted that radiation curable compositon which contain linkable polythiol compounds have a protic character in the non-cured condition due to the protic thiol groups. Upon curing, the protons of the thiol groups are split off so that the cured layers obtain an aprotic character and hence adhere readily to synthetic resin substrates.

In contrast with synthetic resin substrates, a good adhesion to glass substrates is obtained with cured layers having a protic character. Suitable layers can be composed from radiation cross-linkable compounds, such as those described above, modified with non-reactive protic groups such as hydroxy groups or amino groups. An example of such a protic compound is an acrylic acid ester substituted with one or several hydroxy groups, for example, a hydroxyalkyl acrylate or aminoalkyl acrylate.

The liquid radiation curable composition may be provided on the substrate in a traditional manner, for example, by the use of a moulding, injection moulding or spinning process and may then be cured by exposure to light.

According to one aspect of the method of manufacturing a recording element, a matrix is used is used in providing the layer.

According to the invention there is provided a method of manufacturing the information recording element as hereinbefore described which is characterized in that an accurately prepared matrix surface is provided with a layer of the radiation curable liquid composition, the substrate plate is provided on the layer, the layer is cured by radiation via the substrate plate or via the matrix, the assembly of substrate plate and cured layer bonded thereto is removed from the matrix surface and an information recording layer is provided on the side of the cured layer.

This method allows the surface of the cured layer remote from the substrate plate to be fully determined by the matrix surface and also to have the accuracy of the matrix surface. In addition the layer in the above-mentioned method in being enclosed between the matrix and the substrate plate can be very readily radiation-cured, which allows homogeneous curing to occur without the danger of oxygen inhibition.

The matrix used is preferably manufactured from metal or glass. An accurately prepared matrix surface can be readily obtained in particular with these materials by mechanical treatments, The aprotic cured layers do not, or do not seriously adhere to the matrix surface of the prepared metal or glass, so that the above assembly can easily be detached from the matrix surface. The aprotic layers do readily adhere to synthetic resin as said hereinbefore, so that synthetic resin substrate plates are very suitable for use in the above-mentioned process. Such aprotic layers generally adhere unsatisfactorily to glass substrate plates. In one embodiment of the above mentioned method a good adhesion of the aprotic radiation cured lacquer layer to a substrate plate manufactured from glass is obtained. According to this embodiment, a substrate plate manufactured from glass is used which in a pretreatment may be provided with an organic silane compound on its surface to be contacted with the aprotic layer.

Suitable silane compound containing reactive groups which are capable of reacting with the radiation-curable composition are ethenic unsaturated silanes, in particular methacryloxy alkylsilanes such as methacryloxy propyl trimethoxy silane.

It is to be noted that upon radiation of the radiation-curable composition via the substrate plate, the latter should be transparent to the radiation used, for example U.V. light. The same also applies to the matrix if the composition is radiation-cured via the matrix.

In a further embodiment of the recording element the radiation cured layer, on its surface remote from the substrate plate, has an activating layer which in turn is covered by the information recording layer.

The activating layer comprises a material stimulating the formation of holes in the recording layer. For example, the activating layer may comprise a readily vaporisable material, for example Se or Cd, or an compound which upon exposure to laser light decomposes white forming a gaseous product. The activating layer has a small thickness such as for example 30–150 nm and can be provided upon the radiation cured layer by a vapour deposition process.

In a still further and quite interesting embodiment the recording element comprises a radiation cured layer which, on its surface remote from the substrate plate, has an optically readable servo track which has at least partly a relief structure of servo areas situated alternately at a higher and a lower level and corresponding to the stored servo data.

The servo track generally is spiral-like or constructed from concentric circles in which the servo areas situated alternately at a higher and lower level, sometimes termed blocks and pits, respectively, give the information track a crenellated profile.

The longitudinal dimensions of blocks and pits are roughly from 0.5 to 3 $\mu$m. The difference in height between blocks and pits is approximately a quarter of a wavelength of the laser light with which the servo track and the servo data are read optically.

The servo data comprise details regarding the operation of the writing and scanning apparatus, for example data regarding the velocity of recording data and the position on the recording layer where data are to be written.

The recording element provided with a servo track has the significant advantage in that the recording of information in the recording layer can be accurately controlled by the servo data present in the servo tracks. The laser light beam scanning the servo track, hereinafter termed servo laser light, passes the servo data on to a control mechanism which switches the laser to a higher intensity so that the desired information can be written in the recording layer.

The recording of information preferably takes place in those parts of the recording layer which are situated on the servo track between the servo data.

The information recording element provided with a servo track on the cured layer can be manufactured simply by the aforesaid method using a matrix.

In this method, a thin layer of a liquid radiation-curable composition is provided on the surface of a matrix having a servo track, a substrate plate is lied on the liquid composition layer, the composition layer is cured by radiation via the substrate plate or via the matrix, the assembly of substrate plate and the cured layer connected thereto in which the servo track is copied is removed from the matrix surface and provided with an information recording layer on the side of the radiation cured layer.

The recording layer may be provided directly on the radiation cured layer. On the side of the servo track the radiation cured layer may also be covered with the above-described activating layer which in turn is provided with the recording layer.

The servo track is preferably read in reflection through the substrate whereby the read out laserlight is passed through the substrate and the cured layer and reflected partly by the recording layer.

The recording layer generally has a thickness of 100–1000 Å such as 450 Å and follows readily the contour of the servo track. Consequently, reading of the servo data may be carried out either via the upper side of the recording element, that is to say the side remote from the substrate, or via the substrate. Reading via the substrate is to be preferred in which, of course, the substrate and the radiation cured layer should be transparent with respect to the servo laser light beam.

If a radiation-reflective layer of a larger thickness, for example, 0.2 μm, is used, the servo track must be read via the transparent substrate.

Writing information in the recording layer while forming holes may be carried out independently of the thickness of the recording laser either via the upper side (air incident) or preferably via the substrate.

It stands to reason that in case a reflective activating layer such as a vapour deposited layer of Cd with a thickness of about 400 Å is present between the radiation cured layer and the recording layer, the servo track can easily be read out via the substrate by reflecting of the servo laser light beam against said activating layer.

The invention will be described in greater detail with reference to the accompanying drawing.

Figure 1:
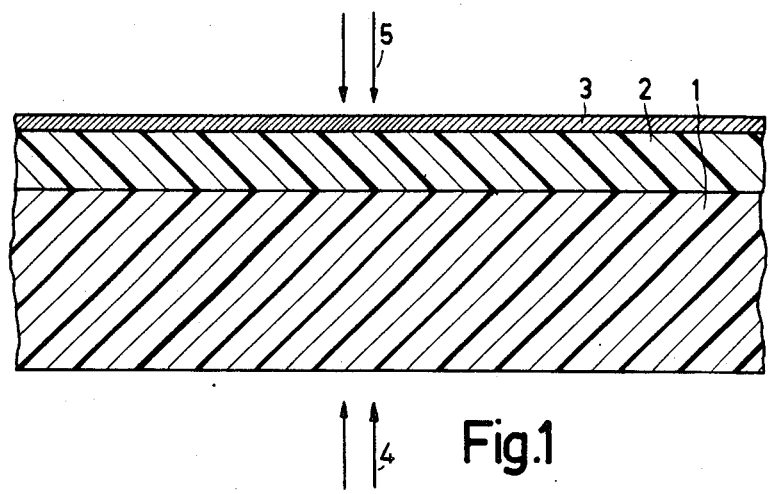
FIG. 1 is a cross-sectional view of an information recording element of the invention.
Figure 2:
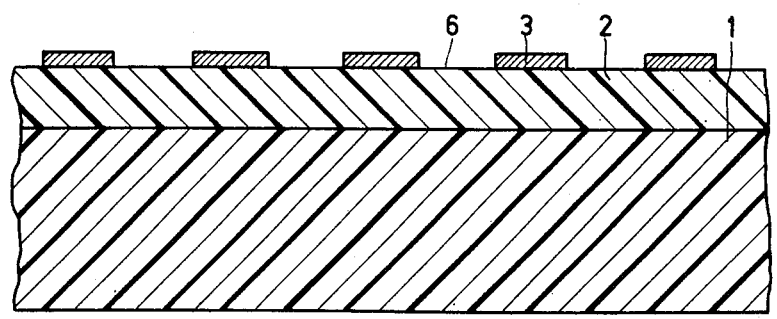
FIG. 2 is a cross-sectional view of the recording element shown in FIG. 1 in which information has been written.

Reference numeral 1 in FIG. 1 denotes a 1 mm thick transparent substrate plate of a synthetic resin, for example polymethyl methacrylate, which is provided on one side with an ultraviolet-light-cured layer 2 containing 60% by weight of ethyl hexyl acrylate, 20% by weight of trimethylol propane triacrylate, 18% by weight of butanediol diacrylate and 2% by weight of benzoin-n-butyl ether. The layer 2 has a thickness of 10 μm and is provided with a recording layer 3 of a germanium-tellurium alloy in a thickness of 0.04 μm. The recording element shown in FIG. 1 is exposed to laser light which is pulsated in accordance with the information to be written. The pulse time is 500 nanoseconds. The exposure may be carried out either via the substrate 1 in the direction denoted by arrows 4 or via the upper side of the recording element in the direction denoted by arrows 5. As a result of the exposure, holes 6 are formed in the recording layer 3 (FIG. 2) in a diameter of 0.5 μm. The reference numerals of FIG. 2 correspond to those of FIG. 1.

Figure 3:
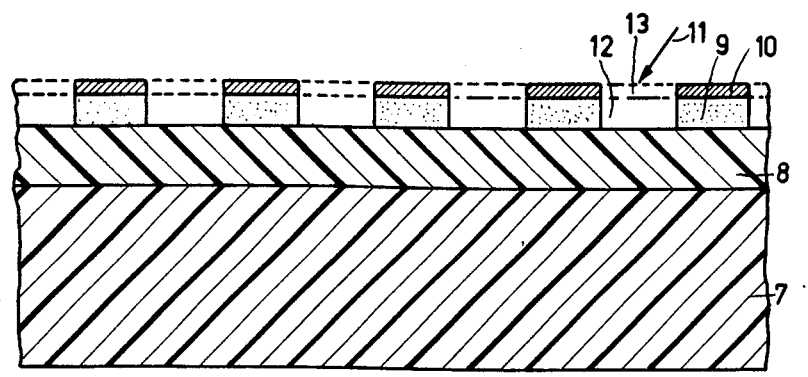
FIG. 3 is a cross-sectional view of another embodiment of the recording element of the invention in which the element comprises an activating layer.

Reference numeral 7 in FIG. 3 denotes a 1 mm thick plate of transparent synthetic resin which is provided with the above-described U.V.-light-cured layer 8. The surface of layer 8 remote from plate 7 has a continuous activating layer 9 with a thickness of 0.15 μm. On its surface remote from lacquer layer 8, activating layer 9 has a continuous bismuth layer 10 in a thickness of 0.04 μm. The recording element is exposed to pulsated laser light, in which the exposure may be carried out either via the upper side or via the synthetic resin plate 7, holes 11 being formed both in the recording layer 10 and in the underlying activating layer 9. It is to be noted that the parts 12 and 13 of activating layer 9 and recording layer 10, respectively, removed after the exposure are shown in broken lines in FIG. 3. The written information can be read by means of laser light either via the upper side of the recording element or via the synthetic resin plate 7. The reading beam has a significantly lower power than the written laser light beam, for example, a reading power which is a factor 10 smaller than the writing power. The value of the writing power depends on various factors, for example, pulse time, nature and thickness of recording layer and activating layer. A writing power of at least 5 mW is generally required on the recording layer.

Figure 4:
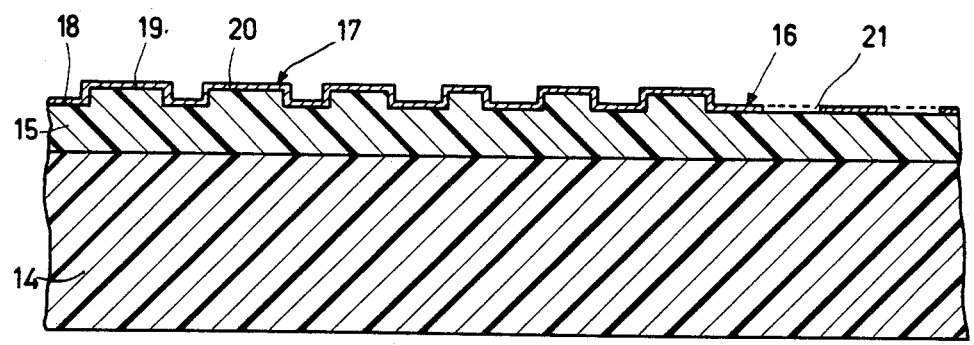
FIG. 4 is a trangential-sectional view of a preferred recording element of the invention having a servo track.

Reference numeral 14 in FIG. 4 denotes a 1 mm thick glass plate provided on one side with a primer (not shown) of—methacryloxypropyltrimethoxysilane which is provided on the side of the primer with the above-described U.V.-light cured layer 15. On its surface remote from plate 14 layer 15 has a servo track 16 which is partly provided with servo data 17 in the form of pits 18 and blocks 19 having longitudinal dimensions of approximately 0.5 μm to 3 μm. The difference in height between blocks and pits is approximately 0.2–0.4 μm. On the side of servo track 16, layer 15 is covered with a recording layer 20 of $Te_{33}Sb_{33}Se_{3y}$ in a thickness of 0.04 μm. The element is exposed to pulsated laser light either via the upper side or via substrate 4, holes 21 being formed by local melting and evaporation of the recording layer in the part of recording layer 20 which covers the part of groove 16 not provided with servo data 17, said holes 21 having a diameter of approximately 0.5–1 μm. The parts of the recording layers removed after the exposure are shown in broken lines. The reading of the servo data and of the written information by means of laser light may be carried out either via the upper side or via the substrate. It is to be noted that the servo data comprise control orders of the writing laser light beam which inter alia the speed and the place of writing, hence of the formation of holes in the recording layer are determined.

What is claimed is:

1. An information recording element for recording optically readable information comprising a substrate plate provided on a surface with a screening layer comprising a cross-linked radiation-cured layer of a radiation-curable solvent-free liquid composition comprising at least one radiation cross-linkable unsaturated compound containing at least an ethene group per molecule, an optically readable servo track on the surface of said screening layer remote from said substrate plate, said servo track at least partially having a relief structure of servo areas corresponding to stored servo data and situated alternatively at higher and lower levels, and in contact with the top of said servo tracks and the surface of said screening layer remote from said substrate plate, an ablative information recording layer capable, upon exposure to laser type radiation, of having an optically readable information track formed therein.

2. The information recording element of claim 1 wherein the ablative information recording layer is a thin layer comprising at least one of the elements selected from group consisting of Bi, Te, Se, Sn, As, Sb, Ge, Ga, In, Te, S and Si.

3. An information recording element as claimed in claim 1, characterized in that on its surface remote from the substrate plate the radiation cured layer has an activating layer which in turn is covered with the information recording layer.

4. An information recording element as claimed in claim 1, characterized in that the liquid composition contains a thin liquid mixture of monomers and/or oligomers on the basis of mono, tri or tetraester of acrylic acid.

5. An information recording element as claimed in claim 4, characterized in that the liquid mixture contains 40–90% by weight of a monoacrylate, 5–50% by weight of a di, tri and/or tetra acrylate as well as 0.5–3% by weight of an initiator.

6. An information recording element as claimed in claim 1, characterized in that the liquid composition contains a mixture of a radiation-linkable polyene compound containing per molecule at least two ethene groups and a polythiol compound containing per molecule two or more thiol groups.

7. An information recording element as claimed in claim 6, characterized in that the liquid composition contains a mixture of a di, tri or tetrathiol compound and a diene, triene or tetraene compound.

8. A method of manufacturing an information recording element as claimed in claim 1 comprising depositing on a matrix surface provided with the negative of said optically readable servo track a layer of said radiation-curable liquid composition, providing said substrate plate on the surface of said liquid composition remote from said matrix surface, curing said radiation-curable liquid composition by radiation through said substrate plate or through said matrix, removing said resultant assembly of substrate plate and cured layer connected thereto from said matrix and then providing said cured layer on the surface remote from said matrix with an information recording layer.

9. A method as claimed in claim 8, characterized in that a substrate plate manufactured from glass is used which on the surface to be contacted with the layer of the radiation curable liquid composition is provided in a pretreatment with an organic silane compound.

* * * * *